United States Patent [19]

Stegemeier et al.

[11] Patent Number: 5,656,239
[45] Date of Patent: Aug. 12, 1997

[54] METHOD FOR RECOVERING CONTAMINANTS FROM SOIL UTILIZING ELECTRICAL HEATING

[75] Inventors: George Leo Stegemeier; Harold J. Vinegar, both of Houston, Tex.

[73] Assignee: Shell Oil Company, Houston, Tex.

[21] Appl. No.: 460,403

[22] Filed: Jun. 2, 1995

Related U.S. Application Data

[63] Continuation of Ser. No. 833,569, Feb. 7, 1992, abandoned, which is a continuation of Ser. No. 427,427, Oct. 27, 1989, abandoned.

[51] Int. Cl.$^6$ ............................................. E02D 31/00
[52] U.S. Cl. ............................................. 422/32; 422/22
[58] Field of Search ............................... 422/1, 22, 26, 422/28, 32, 33; 166/248, 272; 405/128, 129, 131, 248, 258; 219/10.41, 10.57, 10.81

[56] References Cited

U.S. PATENT DOCUMENTS

| | | | |
|---|---|---|---|
| Re. 30,738 | 9/1981 | Bridges et al. | 166/248 |
| 3,732,697 | 5/1973 | Dickson | 405/129 |
| 4,026,355 | 5/1977 | Johnson et al. | 405/129 |
| 4,545,435 | 10/1985 | Bridges et al. | 166/248 |
| 4,670,634 | 6/1987 | Bridges et al. | 219/10.41 |
| 4,895,085 | 1/1990 | Chips | 405/258 X |
| 4,957,393 | 9/1990 | Built et al. | 405/258 |
| 5,249,888 | 10/1993 | Braithwaite et al. | 405/131 X |

OTHER PUBLICATIONS

Betsy Carpenter, "Superfund, superflop —The progress on hazardous waste: Only $300 billion to go", U.S. News & World Report, Feb. 6, 1989.

*Primary Examiner*—Timothy McMahon
*Attorney, Agent, or Firm*—Del S. Christensen

[57] ABSTRACT

An in-situ method is disclosed for low pressure vaporization and recovery of contaminants from surface and near-surface soil by electrically heating the soil with a pattern of hollow electrodes and pulling a deep vacuum through the electrodes. The surface of the soil is sealed with an impermeable barrier supported by the soil. The contaminants are removed by vacuum distillation in the presence of water vapor at a temperature well below the normal boiling point of the contaminants.

26 Claims, 3 Drawing Sheets

FINAL TEMP.:
▽ 95 °C
▼ 100 °C
○ 150 °C
□ 200 °C
△ 250 °C
○ 300 °C

METHOD FOR RECOVERING CONTAMINANTS FROM SOIL UTILIZING ELECTRICAL HEATING

This is a continuation of application Ser. No. 07/833,569, now abandoned filed Feb. 7, 1992, which was a continuation of application Ser. No. 07/427,427 filed Oct. 27, 1989 now abandoned.

BACKGROUND OF THE INVENTION

The contamination of surface and near-surface soils has become a matter of great concern in many locations in the United States and other countries. Increasingly the public has become aware of spills and landfills of toxic and hazardous materials in the soil. If left in place, many of these contaminants will find their way into aquifers or into the food supply, and could become public health hazards.

There are many proposed methods for removal of surface contaminants, such as excavation followed by incineration, in-situ vitrification, bacterial attack, chemical additives for deactivation, radio frequency heating, etc. Although successful in some applications, these methods can be very expensive (hundreds of dollars per ton) and are not practical if many tons of soil must be treated. Moreover, these methods become very expensive and impractical if the depth of the contamination is more than a few feet. The Environmental Protection Agency (EPA) has targeted over a thousand sites for Superfund cleanup. Yet, to date, the EPA has partially cleaned up only a fraction of these sites, spending a staggering $4 billion in the process (U.S. News & World Report, Feb. 6, 1989, p. 47–49).

In U.S. Pat. No. 4,670,634, Bridges et al propose a method for in-situ decontamination of spills and landfills by radio frequency heating. The Bridges et al patent proposes heating the region with bound radio frequency energy (preferably 0.5–45 MHz) from a boundwave transmission line exciter disposed above the soil. The soil is heated to a temperature higher than that needed to boil water, which is said to increase the permeability of the region. A vapor and gas collection and containment barrier is installed above the region to be decontaminated. The heating is continued by dielectric heating after water has boiled from at least a portion of the region so as to heat the portion to elevated temperatures substantially above the boiling point of water. The material is rendered innocuous in-situ in a number of ways, as by pyrolysis, thermally assisted decomposition, distillation, or reaction with an introduced reagent, such as oxygen. The materials may also be driven from the region, as by distillation or by evaporation and steam drive and then collected and disposed of by incineration.

While U.S. Pat. No. 4,670,634 is a significant advance relative to previous remediation methods, it has several disadvantages. The use of radio frequency power in the MHz range makes the process hard to control as the soil dries out; results in less uniform heating because of "hot spots" which are overheated every half wavelength and "cold spots" which are underheated; results in loss of efficiency in the generation of radio frequency power; and emits electromagnetic noise which can interfere with radio communications. Also, because the process in U.S. Pat. No. 4,670,634 operates at atmospheric pressure it requires cumbersome vapor collection barriers at the surface.

What is desired, therefore, is a method for effectively removing contamination which avoids the excavation of large quantities of soil; which can be utilized at depths greater than a few feet; which will efficiently and economically operate at temperatures of no more than about 100° C. while removing contaminants with boiling points substantially greater than that of water; which is generally applicable to a wide range of contaminants (even those with low vapor pressure at room temperature); and which can reduce the level of contamination down to low levels throughout the treated interval.

SUMMARY OF THE INVENTION

In the present invention, an in-situ method is disclosed for remediation and decontamination of surface and near-surface soils by electrically heating the soil through electrodes operated at power line frequencies of about 60 Hz. The electrodes are implanted substantially vertically in the soil in a line pattern which allows substantially uniform electrical heating in the region between rows of electrodes. The depth of electrode insertion is substantially equal to the depth of the contamination, but could be deeper or shallower. The process is particularly applicable to soils contaminated at depths of up to about 30 meters. The electrodes are hollow and perforated below the surface to allow application of a vacuum to the soil through the electrodes. The electrodes are also equipped with provision for electrical connection and vacuum line connection, and also with the capability to be sealed to a barrier that is impermeable to gases, such as a flexible sheet, described hereinbelow.

In one embodiment of this invention, a substantial vacuum is generated by, for example, a vacuum pump, and applied through a pumping manifold connecting to the array or pattern of hollow electrodes. The soil surface is covered by an impermeable flexible sheet which is sealed to the upper part of the electrodes and through which the electrodes protrude into the soil. Applying a vacuum through the electrodes will cause the flexible sheet to be sucked tightly to the ground surface and form a seal against air entering the pattern. The flexible sheet is supported solely by the soil, thereby avoiding bulky vapor containment structures. Substantially only the air, moisture, and contaminants in the pattern will be collected and removed from the hollow electrodes by a pump. Alternatively, the impermeable barrier may be a clay layer placed on the surface. As another alternative, an impermeable clay layer could be used to augment the flexible sheet.

Before applying, while applying and/or after applying electrical heat to raise the soil temperature, a substantial vacuum is created in the soil through the array of hollow electrodes. The vacuum will cause vaporization or boiling of water to occur at a lower temperature than the normal boiling point at atmospheric pressure. At the same time, the high boiling point contaminants will be removed by vacuum distillation in the presence of water vapor within the soil at a temperature well below the normal boiling point of such contaminants. This will occur for all contaminants that are nearly immiscible in water, since the boiling point of the mixture of two immiscible fluids will always be less than the boiling point of either component. Thus, in many cases, it will not be necessary to raise the temperature of the soil above 100° C. This represents a substantial savings in electrical energy.

The hollow electrodes enable application of a much higher vacuum in the soil than that obtainable in a large vapor containment structure. Vacuums as low as 2 psi or below can typically be obtained. Contaminants with boiling points well above 200° C. can thus be removed by this process of vacuum distillation at temperatures of no more than about 100° C., and as low as about 50° C. Moreover, the amount of steam required per unit quantity of distillate will be diminished by lowering the total pressure. Thus the process can be applied in soils which have low in-situ moisture content.

The water vapor and contaminants may be collected, in a cold trap and/or condenser located between the pumping manifold and the vacuum pump. The water and contaminant liquids from the cold trap and/or condenser can be separated on the basis of density in a separator, while the gases can be reused, or incinerated, or otherwise disposed. Alternatively, the contaminants can be trapped and concentrated, for example, on molecular sieve material or on activated carbon, or in a wet scrubber. Thereafter the concentrated contaminants can be reused, or incinerated, or otherwise disposed.

By pulling moisture toward and into the hollow electrodes, and by concurrently providing only modest electrical heating, the soil near the electrodes will stay electrically conducting. Thus, inexpensive 60 Hz power from a power line transformer can be used for heating the soil, rather than radio frequency power with its attendant disadvantages. The applied vacuum assures that volatilized components are contained and not dispersed to surrounding soil.

In an additional method of practicing this invention, once the hollow electrodes and pumping manifold are in place, various gases and liquids can be introduced to the soil at the surface, or injected through selected groups of hollow electrodes or injection wells and withdrawn from other groups of electrodes or other wells. Thus, for example, water, steam, oxygen, hydrogen peroxide, or other reactants, or combinations of these materials, could be injected to further remove or decompose the contaminants, as required. This could be done in conjunction with electrical heating to accelerate the reaction kinetics for the decomposition of the contaminants.

Other methods of practicing this invention include additional steps. For example, in very moist soil, liquid water could be removed by evacuation through the electrodes prior to electrical heating, thereby desaturating the soil and reducing the electrical power required for vaporization of the liquids.

Still another method of practicing this invention is applicable to deep contamination, well below the water table. Electrical heating is used to create a vapor zone in the contaminated region between the electrodes. In this case it is necessary to heat the contaminated region to higher temperatures, sufficient to vaporize the water at the downhole pressures which can be substantially above atmospheric pressure. At these depths, it may not be necessary to evacuate the hollow electrodes because the downhole pressures may be sufficient to drive the water vapor and contaminants to the surface.

Some of the contaminants that can be removed by this process include hydrocarbons, pesticides, chlorinated hydrocarbons such as PCBs, chemical warfare products, and radioactive wastes such as tritium and tritiated water. The invention is in general applicable to any contaminant which has a sufficient vapor phase at elevated temperatures and reduced pressures.

DETAILED DESCRIPTION OF PREFERRED EMBODIMENTS

According to the present invention, an array of hollow, perforated electrodes is inserted into the soil and used to electrically heat the soil. The spacing of the electrodes can be such that they are in parallel rows, with the spacing between electrodes in each row small compared to the distance between rows. Thus, for example, the distance between electrodes in a row could be 1 meter (m), while the distance between rows could be 3 m. The number of electrodes in a row is such that the total row length is very long compared to the distance between rows. For example, there may be 33 electrodes in a row, so that $33 \times 3 = 99$ m$\gg$3 m. The spacing between electrodes in the row, spacing between the rows, and diameter of the electrodes are selected to prevent overheating at the electrodes. Other electrode array configurations are also possible.

Figure 1:
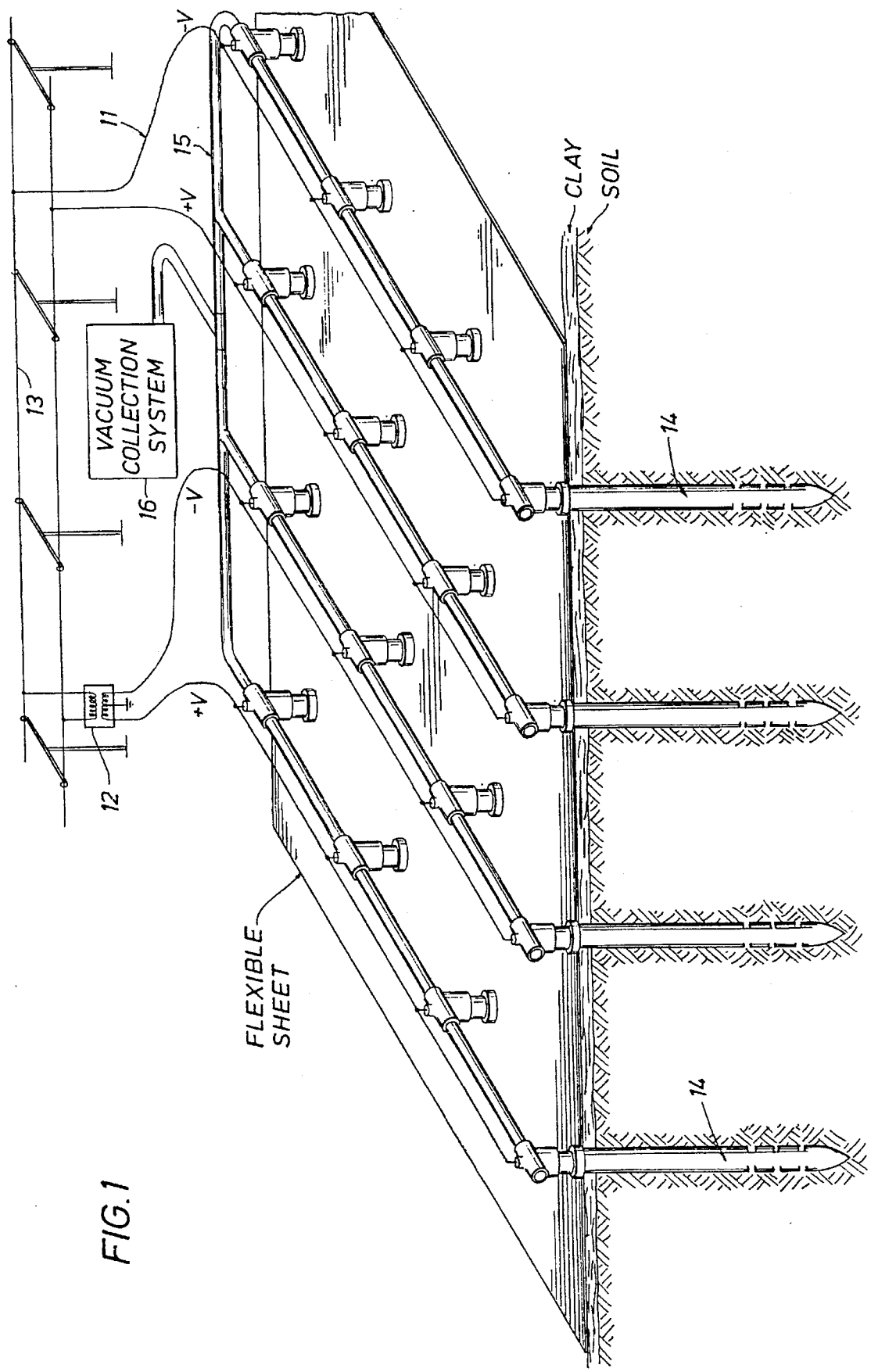
FIG. 1 shows the array of electrodes according to the present invention, with a cross-sectional view in a plane coincident with an electrode row.

Referring now to FIG. 1, the electrodes are energized from a low-frequency power source at 60 Hz or below by means of a common bus line 11 which may connect, for example, to a transformer 12, a power conditioner (not shown) or directly to the power line 13. Surface facilities (not shown) are also provided for monitoring current, voltage, and power. The electrodes in adjacent rows are not necessarily on line with each other.

Low frequency electrical power (preferably at 60 Hz power line frequencies) is used to heat the soil. The electrodes 14 within a row are energized from a common voltage source. The rows are alternately energized +V and −V. The use of +V and −V, rather than +2 V and 0 (ground) potential, results in less leakage of electrical power from the electrode array to distant electrical grounds. This also results in much safer operating voltages, which are only half as much as when referenced to ground potential. The rows may also alternate in pairs, for example, in a pattern of +V, +V, −V, −V. The precise electrode configuration will be determined by an economic optimum which depends, in turn, on the cost of installing the electrodes and the cost of electrical power in a particular region. Closer electrode spacing requires more electrodes but wastes less electrical power below the contaminated zone.

The electrodes make electrical contact to the formation only in a thickness substantially equal to the zone to be heated. The electrodes could extend below the decontamination zone in order to pull additional moisture from soil below the decontaminated surface layer, or in order to guarantee no migration of the contaminants to deeper depths. The greater the length of the electrodes relative to the distance between rows, the better the vertical confinement of the electrical current flow which fringes below the electrodes. As a general rule, the distance between rows should be no more than about three times the depth of the electrodes to avoid significant loss of power by fringe fields below the electrodes. However, greater distances between rows may be preferable if the cost of electrode placement has more substantial impact on the economics than the electrical power costs.

The fluid and vapor collection facilities are also shown in FIG. 1. The pumping manifold 15 is connected into a vacuum collection system 16. The vacuum collection system includes, for example, a cold trap and condenser, a vacuum pump, and a separator. The pumping lines of the pumping manifold may be constructed, for example, of polyvinyl chloride (PVC) pipe, for low cost and electrical insulation. The vacuum pump should be capable of pulling a vacuum of approximately 2 psia or lower at the perforations in the electrodes. The water vapor and contaminants are transported from the soil, through the hollow electrodes and the pumping manifold, and are collected in a separator (not shown) connected to the pumping manifold. The water and contaminant liquids can be separated from the vapors and gases on the basis of density in the separator. Alternatively, the contaminants can be trapped and concentrated on molecular sieve material, on activated carbon, or in a wet scrubber, or in the cold trap. The contaminants may be recovered and reused, or may be incinerated or disposed of by other means.

In an alternative method of practicing this invention, once the hollow electrodes, pumping manifold, and vacuum collection system are in place, various gases and liquids can be introduced to the soil at the surface, or injected through selected groups of hollow electrodes with, for example, an injection pump (not shown) and withdrawn through other electrodes. Thus, for example, water, steam, oxygen, hydrogen peroxide, or other reactants, or combinations thereof, could be injected to further remove or decompose the contaminants, as required. This could be done in conjunction with electrical heating to accelerate the reaction kinetics for the decomposition of the contaminants. Introduction of superheated steam through a selected group of electrodes while reducing the pressure in other groups of electrodes would reduce the steam requirements for the distillation of high boiling point materials.

Figure 2:
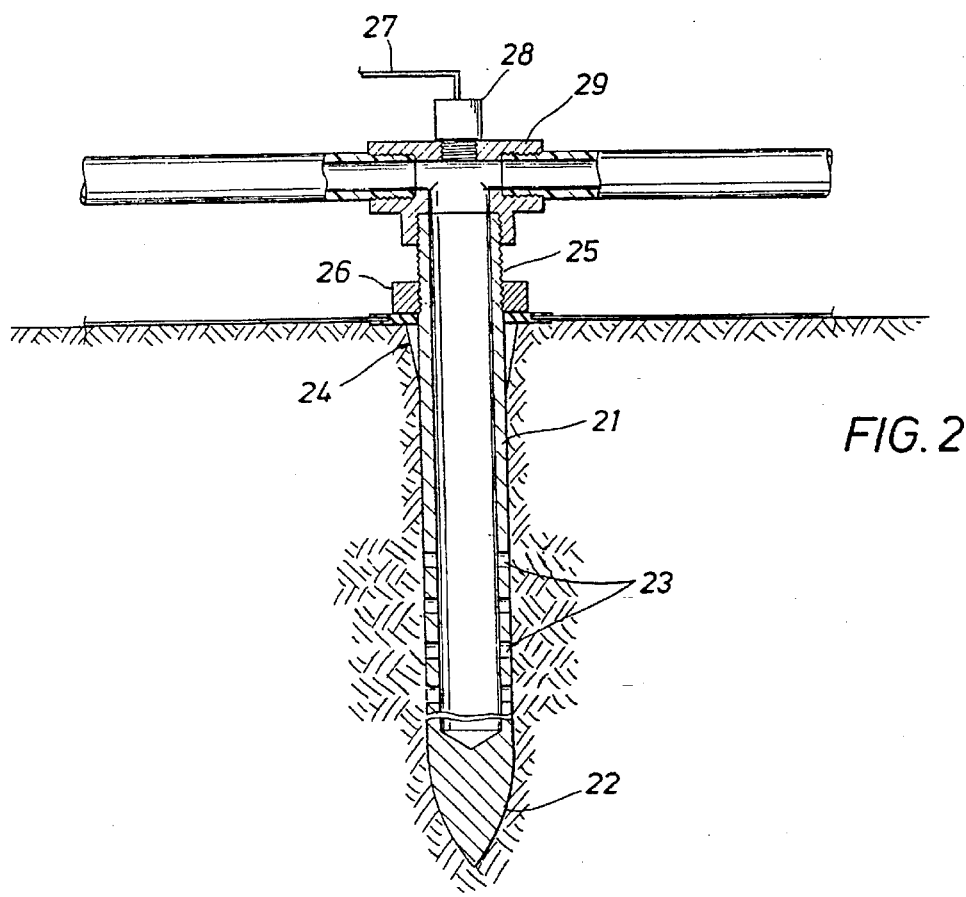
FIG. 2 shows a detailed cross-sectional view of a hollow electrode, including electrical connections and vacuum connections.

Referring now to FIG. 2, there is shown a detailed drawing of a hollow electrode, including electrical connections, vacuum connections, and means to provide a seal between the electrode and an impermeable barrier, such as a flexible sheet. The electrodes 21 are constructed from one or more metals which are good conductors, such as aluminum or copper, and strong, such as steel. Stainless steel may be used for corrosion resistance. The diameter of the electrode should be as large as possible to minimize overheating at the electrode but still allow easy installation in the soil. Depending on the rate of heating, an electrode with a diameter of about 7-8 cm and a length of about 2-3 m is suitable for sandy soils with contamination extending down about 2 m. The depth of electrode insertion is substantially equal to the depth of contamination, but could be deeper or shallower. The process is particularly applicable to soils contaminated at depths extending down to about 30 meters.

The electrode has a pointed tip 22 for easy insertion into the soil. The pointed tip should be made from a nonconductive material such as wood or plastic to prevent electric field lines from converging at the tip. The electrode has perforations 23 or slots which allow fluid and vapor to flow into the interior of the electrode. Finally, the electrode has a smooth lip 24 and threaded upper part 25 with nut 26 that allows sealing to the flexible sheet. A conducting cable 27 connects the electrode with the power bus at the surface. The cable may or may not be insulated, but should be constructed of a nonferromagnetic conductor such as copper or aluminum to reduce magnetic hysteresis losses in the cable. Electrical connections 28 and vacuum connections 29 are also provided on the electrode.

The electrodes are either placed in a predrilled hole, or preferably simply driven in the ground, for example, by a hammer or pile driver. Avoiding excavation by driving electrodes into the soil offers distinct advantages when working in severely contaminated areas. Most preferably, the array pattern is first marked on the ground, and then a pile driver automatically drives the electrodes into the marked spots.

Figure 3:
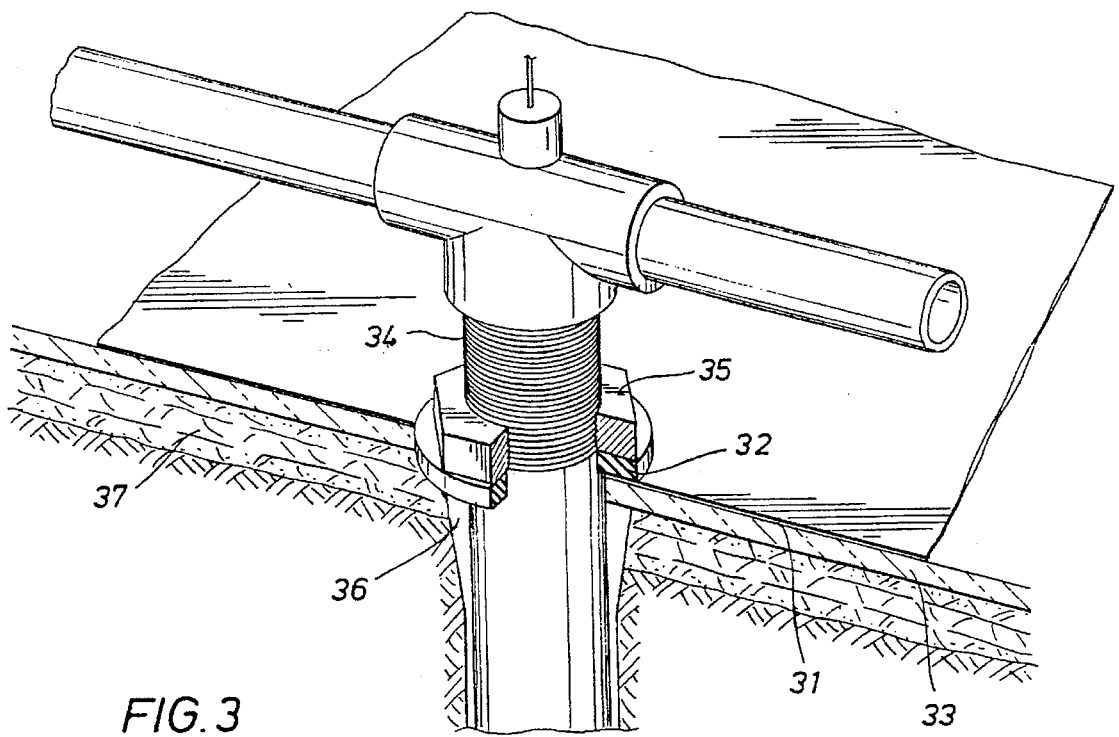
FIG. 3 shows a detailed cross-sectional view of the flexible sheet for sealing the surface of the soil, along with insulation and clay layers.

Referring now to FIG. 3, there is shown an impermeable flexible sheet 31 for covering the surface of the soil. This may be constructed of polyester film, polyethylene, silicone rubber, VITON, VITON-reinforced fiberglass, TEFLON, TEFLON-reinforced fiberglass, or other materials which are impermeable to gas flow. The thickness of the flexible sheet may be, for example, 3 to 125 mils. Holes may be premanufactured in the sheet in the pattern of the electrode array. Reinforcement may be used around the holes to prevent tearing. The holes have a rubber gasket 32 surrounding them, sealed to the flexible sheet with adhesives, which will also be used for sealing the sheet to the electrodes. A layer of thermal insulation 33 may be placed between the soil surface and the flexible sheet to minimize heat losses from the soil. The thermal insulation could be, for example, mineral or cotton wool, polystyrene foam, or aluminized mylar (superinsulation). If aluminized mylar is used, care must be taken to prevent electrical conduction between the electrodes through the aluminum film.

In operation, the flexible sheet is laid out over the electrodes after the electrodes have been embedded in the soil. The top of the electrodes 34 protrude through the holes in the flexible sheet. The nut 35 then is threaded down on the threaded upper part of the electrode to cause the rubber gasket 32 and smooth lip 36 to seal against the flexible sheet.

In an alternative practice of this invention, the flexible sheet is replaced or augmented by clay 37 disposed on the surface of the soil. The clay may be coated on the surface and tamped down to make an impermeable seal at the surface. Clay may be particularly effective in sealing around the electrode wells. If thermal insulation is used, it may be placed above the clay layer.

Before applying, while applying, and/or after applying electrical heat to raise the soil temperature, a vacuum is applied to the soil through the array of hollow electrodes. Pulling a vacuum before initiation of heating will minimize dispersion of contaminants. The vacuum will cause vaporization or boiling of the water and contaminants in the soil to occur at a lower temperature than the normal boiling point at atmospheric pressure. It is important to maintain a positive flow of any vaporized components into the hollow electrodes by applying a vacuum. At the same time, the high boiling point contaminants will be removed by vacuum distillation in the presence of water vapor at a temperature well below the normal boiling point of the contaminants. This will be true for all contaminants that are nearly immiscible in water, since the boiling point of the mixture of two immiscible fluids will always be less than the boiling point of either component.

This is made more clear by considering, as an example, the vapor pressure of a mixture of water and n-dodecane, a typical hydrocarbon, compared with that of water and n-dodecane each alone, as a function of temperature. N-dodecane alone has a normal boiling point of 216° C. and a solubility in water of 4-5 parts per billion. The boiling point of the water and n-dodecane mixture at atmospheric pressure is just below the boiling point of water, about 99° C. Thus the temperature of the soil does not have to be raised to 216° C. to remove the n-dodecane, but rather to much more modest temperatures of less than about 100° C. The boiling point of the mixture can be lowered still further if the pressure is reduced by pulling a vacuum through the electrodes. This represents a substantial savings in electrical energy as discussed below. Contaminants with boiling points well above 200° C. can thus be removed by this process of vacuum distillation at temperatures of no more than about 100° C.

By pulling moisture toward and into the hollow electrodes, and by providing only modest electrical heating, the soil near the electrodes will stay moist and electrically conducting. Thus, inexpensive 60 Hz power from a power line transformer can be used for heating the soil, rather than radio frequency power with its attendant disadvantages. Alternatively, the soil may also be first heated electrically to a temperature above 50° C. but no more than about 100° C., and then the soil evacuated after the electrical power is turned off. This guarantees that the electrodes will stay sufficiently moist for the electrical heating stage. The temperature of the soil will drop during the evacuation stage, so that the process may consist of repetitive cycles of electrical heating, vacuum distillation, electrical heating, vacuum distillation, etc.

However, if the soil contains a large amount of free water, it may be economically attractive to initially reduce the water content of the soil. The process can start with pumping through the manifold to remove the free water, followed by electrical heating. This saves the electrical energy required to vaporize the excess free water from the soil. Also, if the soil conditions are nearly dry, it may be advantageous or necessary to add water or steam to the soil to enhance electrical conductivity.

In an alternative method of practicing this invention, the electrodes could be solid, and a separate set of production wells could be drilled between the electrode wells. The production wells would be constructed of hollow perforated tubes similar to those described above, but could be nonmetallic, since no electrical conduction is required. PVC or fiberglass are examples of suitable construction materials. The production wells would connect to the vacuum manifold in a manner similar to that shown in FIG. 1.

Finally, another method of this invention is applicable to deep contamination, below the water table, where the fluid pressure may be well above atmospheric pressure. Electrical heating is used to create a vapor zone between the electrodes at the depth of the contamination. To insure heating in the zone of interest, the electrodes may make electrical contact with the formation substantially only over the contaminated zone. In this case it is necessary to heat the contaminated region to higher temperatures sufficient to vaporize the water at the downhole pressures.

One of the main advantages of the reduced pressure vaporization in this invention is the reduction in steam required to remove a given amount of contaminant. For example, suppose the soil contaminant is n-dodecane ($C_{12}H_{22}$, Molecular Weight=166), the soil temperature is heated to about 100° C. and the pressure is atmospheric pressure (760 mm Hg). The vapor pressure of n-dodecane at this temperature is 18.5 mm Hg. The quantity of n-dodecane in 1 lb-mole of the vapor is 18.5 mm/760 mm=0.0243 lb-mole, or 0.0243×166=4.04 lb. The quantity of water (Molecular Weight=18) is 0.9757 lb-mole, or 0.9757×18= 17.56 lb. Thus the amount of steam used to produce one pound of n-dodecane is 17.56/4.04=4.35 lb.

For comparison, assume the same temperature as before, but a pressure reduced to 50 mm Hg by evacuating the electrodes. The quantity of n-dodecane in the vapor is now 18.5 mm/50 mm=0.370 lb-mole, or 61.4 lb. The quantity of water is 0.630 lb-mole, or 11.34 lb. Thus the amount of steam used to produce one pound of n-dodecane is 11.34/61.4=0.18 lbs.

Because the steam requirements are reduced, there is a substantial energy savings in heat of vaporization relative to operating the process near atmospheric pressure. Moreover because the amount of steam required per unit quantity of contaminant will be diminished by lowering the total pressure, the process can be applied in soils which have low in-situ moisture content or high contaminant levels relative to moisture content.

Figure 4:
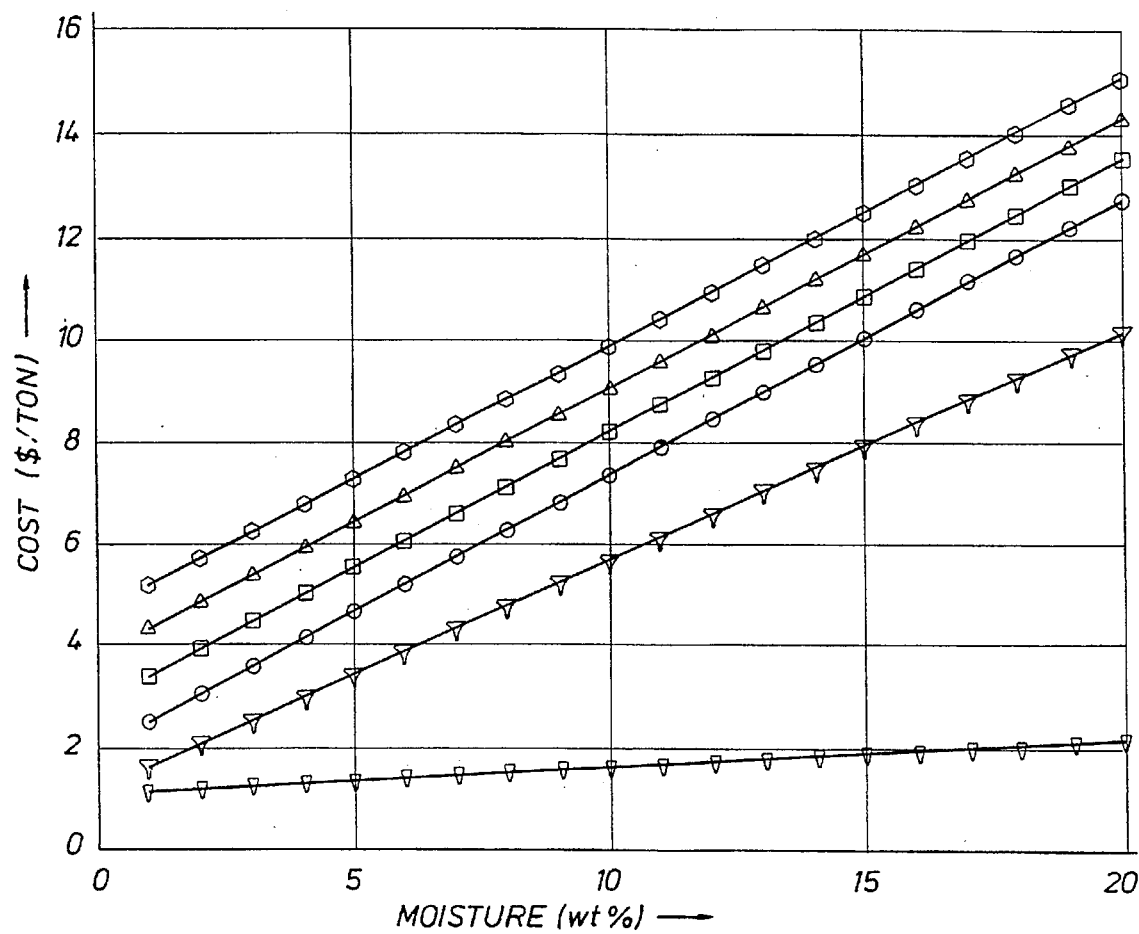
FIG. 4 shows the cost per ton to raise soil to various temperatures as a function of initial moisture content in the soil.

Referring now to FIG. 4, there is shown the cost in dollars per ton to raise soil to various final temperatures as a function of moisture content of the soil. The assumptions are: (a) electrical costs of $0.055 per KWh, (b) initial temperature of 21° C., and (c) 75 percent energy contained in the region to be decontaminated. For soil with original moisture content of 5 percent, the electrical cost will be about $3.50/ton to raise the temperature to 100° C. This is about 100 times less expensive than other methods of decontamination mentioned hereinbefore.

Various modifications of the present invention will become apparent to those skilled in the art from the foregoing description. Such modifications are intended to fall within the scope of the appended claims.

What is claimed is:

1. A method for remediation and decontamination of surface and near-surface soils comprising the steps of:
   implanting a pattern of hollow perforated electrodes into the soil;
   covering the surface of the soil with an impermeable barrier;
   applying a vacuum to the soil said vacuum being greater than 2 psia at the perforations in the electrodes;
   electrically heating the soil by conduction heating at power line frequencies through the pattern of electrodes wherein the soil is electrically heated to a temperature between 50° C. and no more than 99° C.;
   vaporizing contaminants in the soil at a temperature below the normal boiling point of the contaminants; and
   recovering the contaminants from the soil through the hollow perforated electrodes.

2. The method of claim 1 wherein the impermeable barrier is a flexible sheet.

3. The method of claim 1 wherein the impermeable barrier is a clay layer disposed on the surface of the soil and rendered impermeable by the application of said vacuum.

4. The method of claim 1 comprising the additional step of applying said vacuum to the soil through the pattern of electrodes, before electrically heating the soil, to avoid dispersion of contaminants and to remove excess water from the soil.

5. The method of claim 1 comprising the additional step of injecting water or steam through the pattern of electrodes and into the soil, to enhance the soil's electrical conductivity.

6. The method of claim 1, comprising the additional step of injecting a fluid into the soil through a first group of electrodes while applying a vacuum to the soil through a second group of electrodes, to further remove or decompose the contaminants in the soil.

7. The method of claim 6 wherein the fluid injected into the soil is hot water or steam.

8. The method of claim 1 comprising the additional step of introducing a fluid to the soil at the surface to enhance the soil's electrical conductivity.

9. The method of claim 1 comprising the additional step of introducing a fluid to the soil at the surface, while applying a vacuum to the soil, to further remove or decompose the contaminants in the soil.

10. A method for the remediation and decontamination of surface and near-surface soils comprising the steps of:

implanting a pattern of solid electrodes into the soil;

installing a pattern of hollow perforated production wells into the soil such that the production wells are situated between said electrodes;

covering the surface of the soil with an impermeable barrier;

applying a vacuum of greater than 2 psia to the soil through the production wells;

electrically heating the soil by conduction heating at power line frequencies through the pattern of electrodes wherein the soil is electrically heated to a temperature between 50° C. and no more than 99° C.;

vaporizing contaminants in the soil at a temperature below the normal boiling point of the contaminants; and recovering the contaminants from the soil through said hollow, perforated production wells.

11. The method of claim 10 wherein said impermeable barrier is a flexible sheet.

12. The method of claim 10 wherein the impermeable barrier is a clay layer disposed on the surface of the soil and rendered impermeable by the application of said vacuum.

13. The method of claim 10 comprising the additional step of applying said vacuum to the soil through the production wells, before electrically heating the soil, to remove excess water from the soil and to avoid dispersion of contaminants.

14. A method for remediation and decontamination of surface and near-surface soils comprising the steps of:

implanting a pattern of hollow perforated electrodes into the soil;

covering the surface of the soil with an impermeable flexible sheet;

applying a vacuum of greater than 2 psia to the soil through said pattern of hollow perforated electrodes;

electrically heating the soil by conduction heating at power line frequencies through said pattern of hollow perforated electrodes to a temperature of from about 50° C. to about 99° C.;

vaporizing contaminants in the soil at a temperature below the normal boiling point of the contaminants; and recovering the contaminants from the soil through said pattern of hollow perforated electrodes.

15. The method of claim 14 comprising the additional step of injecting hot water or steam into the soil through a first group of electrodes while applying a vacuum to the soil through a second group of electrodes, to further recover or decompose the contaminants in the soil, after electrically heating and vaporizing the contaminants.

16. A method for the remediation and decontamination of surface and near-surface soils comprising the steps of:

implanting a pattern of hollow, perforated electrodes into the soil;

installing a pattern of hollow, perforated production wells into the soil;

covering the surface of the soil with an impermeable barrier;

applying a vacuum of greater than 2 psia to the soil through said production wells;

injecting a fluid into the soil through said electrodes;

electrically heating the soil by conduction heating at power line frequencies through said pattern of electrodes wherein the soil is electrically heated to a temperature between 50° C. and no more than 99° C.;

vaporizing contaminants in the soil at a temperature below the normal boiling point of said contaminants; and recovering said contaminants from the soil through said hollow, perforated production wells.

17. The method of claim 16 wherein the fluid injected into the soil is hot water or steam.

18. The method of claim 16 comprising the additional step of introducing a fluid to the soil at the surface to enhance the soil's electrical conductivity.

19. A method for remediation and decontamination of surface and near-surface soils comprising the steps of:

implanting a pattern of hollow perforated electrodes into the soil, the pattern comprising parallel rows of electrodes;

covering the surface of the soil with an impermeable barrier;

applying a vacuum to the soil said vacuum being greater than 2 psia at the perforations in the electrodes;

electrically heating the soil by conduction heating at power line frequencies through the pattern of electrodes, the rows of electrodes alternately energized wherein the soil is electrically heated to a temperature between 50° C. and no more than 99° C.;

vaporizing contaminants in the soil at a temperature below the normal boiling point of the contaminants; and recovering the contaminants from the soil through the hollow perforated electrodes.

20. The method of claim 19 wherein spacing between electrodes in a row is small compared to spacing between rows of electrodes.

21. The method of claim 19 wherein spacing between rows of electrodes is at least three times the spacing between electrodes within the rows.

22. The method of claim 19 wherein the electrodes comprise solid, pointed lower tips of a nonconductive material.

23. A method for remediation and decontamination of surface and near-surface soils comprising the steps of:

implanting a pattern of hollow perforated electrodes into the soil, the pattern comprising parallel rows of electrodes;

covering the surface of the soil with an impermeable barrier;

applying a vacuum to the soil said vacuum being greater than 2 psia at the perforations in the electrodes;

electrically heating the soil by conduction heating at power line frequencies through the pattern of electrodes, pairs of the rows of electrodes alternately energized wherein the soil is electrically heated to a temperature between 50° C. and no more than 99° C.;

vaporizing contaminants in the soil at a temperature below the normal boiling point of the contaminants; and recovering the contaminants from the soil through the hollow perforated electrodes.

24. The method of claim 23 wherein spacing between electrodes in a row is small compared to spacing between rows of electrodes.

25. The method of claim 23 wherein spacing between rows of electrodes is at least three times the spacing between electrodes within the rows.

26. The method of claim 23 wherein the electrodes comprise solid, pointed lower tips of a nonconductive material.

* * * * *